US007211745B1

(12) United States Patent
Brown et al.

(10) Patent No.: US 7,211,745 B1
(45) Date of Patent: May 1, 2007

(54) PRECISION HARVESTING AND ANALYSIS TECHNIQUES FOR CROPS

(75) Inventors: Patrick H. Brown, Sacramento, CA (US); Uriel A. Rosa, Davis, CA (US); Shrini Upadhyaya, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 238 days.

(21) Appl. No.: 10/897,414

(22) Filed: Jul. 21, 2004

Related U.S. Application Data

(60) Provisional application No. 60/489,584, filed on Jul. 22, 2003.

(51) Int. Cl.
*G01G 13/22* (2006.01)

(52) U.S. Cl. .......................... 177/1; 177/199; 177/121; 177/145; 177/83; 222/56; 222/77; 56/340.1

(58) Field of Classification Search .................... 177/1, 177/145, 121, 83, 119; 222/55–56, 77; 56/340.1; 701/50
See application file for complete search history.

(56) References Cited

U.S. PATENT DOCUMENTS

| 2,659,564 A | * | 11/1953 | Gibson ....................... 177/121 |
| 5,191,758 A | * | 3/1993 | Cote ............................ 56/329 |
| 5,919,390 A | * | 7/1999 | Childress .................... 219/725 |
| 5,959,257 A | * | 9/1999 | Campbell et al. ............. 177/16 |
| 6,066,809 A | * | 5/2000 | Campbell et al. ............. 177/16 |
| 6,407,346 B1 | * | 6/2002 | Baker .......................... 177/83 |
| 2005/0027420 A1 | * | 2/2005 | Fujishima et al. ........... 701/50 |

* cited by examiner

*Primary Examiner*—Randy W. Gibson
*Assistant Examiner*—Sean Kayes
(74) *Attorney, Agent, or Firm*—Townsend and Townsend and Crew LLP

(57) ABSTRACT

A method for weighing a crop is disclosed. The method includes (a) loading a crop into a container using a crop transport apparatus, (b) temporarily stopping the crop transport apparatus from loading the crop into the container, (c) weighing the crop using the container, (d) unloading the weighed crop from the container by automatically manipulating the container, and (e) repeating steps (a)–(d).

3 Claims, 13 Drawing Sheets

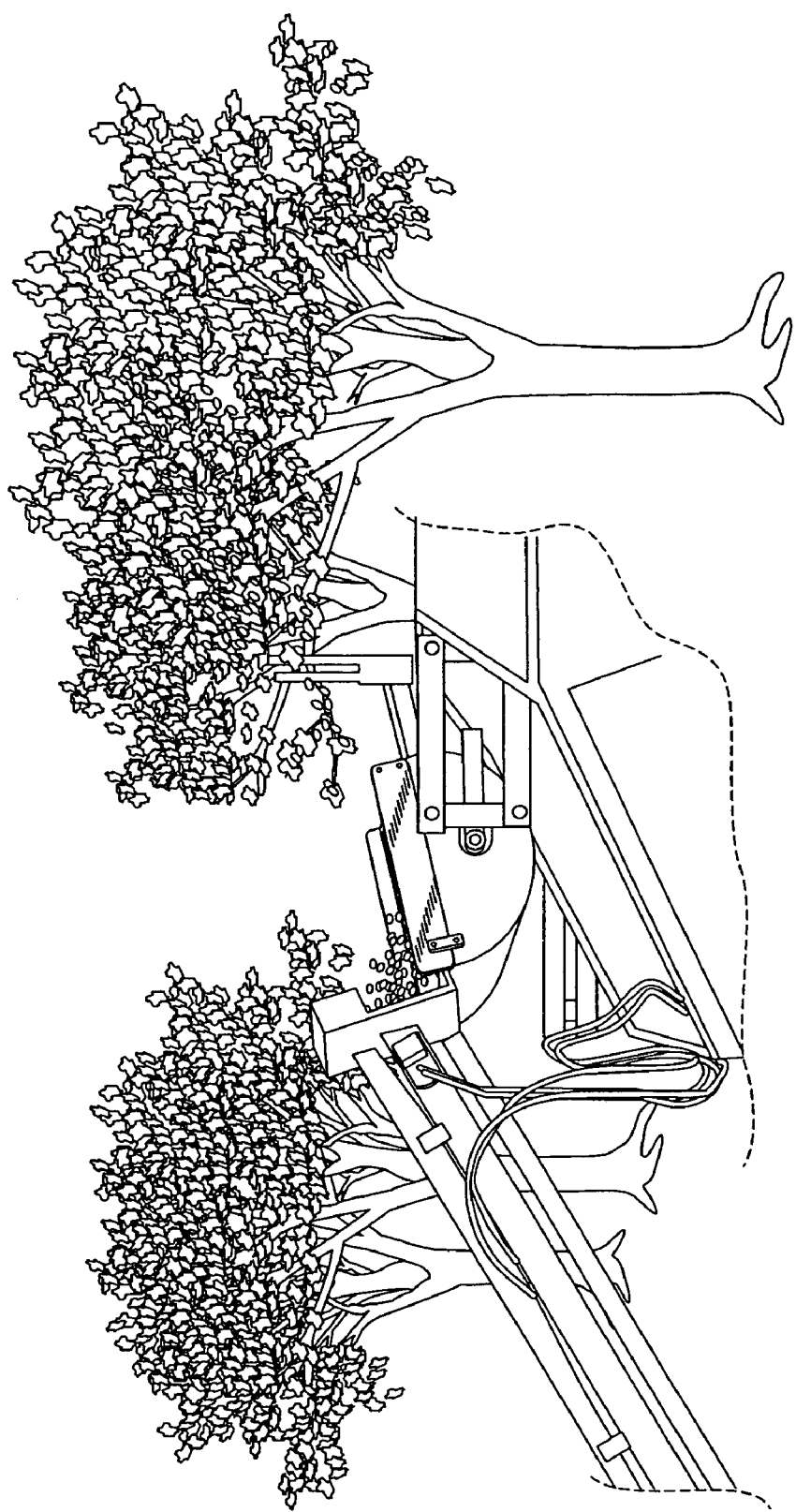

PRECISION HARVESTING AND ANALYSIS TECHNIQUES FOR CROPS

CROSS REFERENCE TO RELATED APPLICATIONS

This application is a non-provisional of and claims the benefit of the filing date of U.S. Provisional Patent Application No. 60/489,584, filed on Jul. 22, 2003, which is herein incorporated by reference in its entirety for all purposes.

BACKGROUND OF THE INVENTION

Methods that are available to measure crop yield include: direct determination, and instantaneous measurements of volume or mass flow. A common practice is to use scales to directly measure the weight of bins containing small sections of a harvested crop. These bins are usually containers mounted on wagons, trailers or harvesters. However, due to the characteristics of this method, yield information is obtained for entire fields or strips of a field. The yield of a large area is indirectly integrated by averaging the data and, consequently, a coarse-ground resolution is obtained for this type of monitoring system.

Instantaneous flow type monitors are commercially available with either volumetric or mass flow-type sensors. Volumetric type yield monitors have typically been developed for cotton harvesters. A mass type yield monitor is present in grain crop production (typically uses impact plates), as well as in the production of potatoes, tomatoes (uses a type of load cell sensor) and other crops. Yield monitoring systems depend heavily on ground resolution. In either type of monitor, however, the fine ground-resolution obtained from instantaneous monitoring systems is degraded due to transport lag of crops inside the harvesters. Consequently, yield maps suffer some sort of integration during the process of their creation.

It is desirable to monitor the yield of crops. For example, vegetable crop specialists, farm advisors, and extension specialists rely on accurate measurement of tomato yield to test the performance of new tomato varieties and other agronomic procedures. These studies are usually conducted in controlled plots. For example, weigh wagons are usually used to obtain tomato yield data. Although accurate, weigh wagons are expensive, require an additional tractor and operator, slow down harvesting, cause considerable damage to tomatoes and are not easy to transport from one field to another.

Embodiments of the invention address these and other problems.

SUMMARY OF THE INVENTION

Embodiments of the invention are directed to systems and methods for weighing crops such as crops from trees. Other embodiments of the invention are directed to creating yield maps for fields or orchards.

One embodiment of the invention is directed to a method for weighing crops, the method comprising: (a) loading a crop into a container using a crop transport apparatus; (b) temporarily stopping the crop transport apparatus from loading the crop into the container; (c) weighing the crop using the container; (d) unloading the weighed crop from the container by automatically manipulating the container; and (e) repeating steps (a)–(d).

Another embodiment of the invention is directed to a system for weighing crops, the system comprising: (a) a container; (b) a crop transport apparatus adapted to feed crops into the container, (c) a load cell coupled to the container; and (d) a computer system for (i) controlling the movement of the container for loading and unloading of crops in the container, (ii) controlling the movement of the crop transport apparatus, and (iii) recording the weight of crops inside of the container.

Another embodiment of the invention is directed to a method for creating a yield map for an orchard, the method comprising: (a) harvesting a crop from a tree in the orchard; (b) automatically loading the harvested crop into a weighing container; (c) automatically weighing the harvested crop in the weighing container; (d) automatically unloading the weighed crop in (c); (e) repeating steps (a)–(d); and (f) creating a yield map of the orchard after (e).

Another embodiment of the invention is directed to a system for weighing crops, the system comprising: (a) a container; (b) a load cell coupled to the container; and (c) a computer system for (i) controlling the movement of the container for loading and unloading of crops in the container, and (ii) recording the weight of crops inside of the container.

As will be shown in further detail below, a system including an electronic weigh bucket (EWB) was designed and a prototype was developed to retrofit onto a commercial tomato harvester. The weigh bucket consisted of a 0.6 m diameter semicircular cylinder suspended by a linkage mechanism attached to a load cell. An electrohydraulic actuator emptied the weigh bucket at predetermined time intervals. An electronic data acquisition system monitored the weight of the bucket as well as its inclination continuously. The prototype was also mounted on a commercial pistachio harvester to monitor the yield of individual trees in an orchard.

Field tests indicated that the EWB was accurate with respect to weigh wagons in measuring tomato yields (2.5% error). Moreover, the device successfully measured yield of individual pistachio trees in a pistachio orchard. Yield variability maps were created by using field data.

These and other embodiments of the invention are described below.

BRIEF DESCRIPTION OF THE DRAWINGS

FIG. 6(A) shows an overview of a pistachio yield monitor mounted on the trailer of a pistachio harvester. The rubber extensions skirting the top rim of the weigh bucket were used to increase its capacity.

DETAILED DESCRIPTION

Figure 1A:
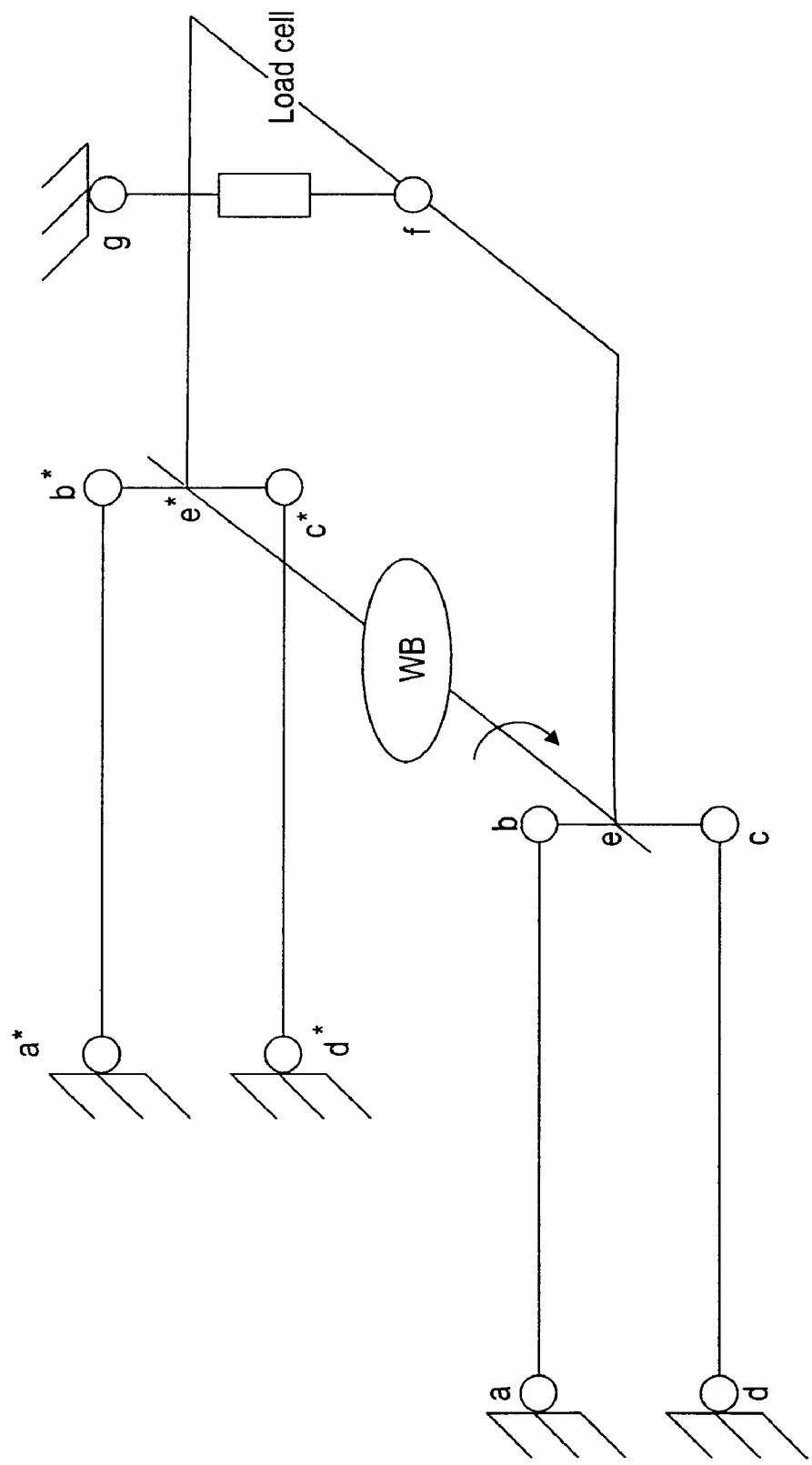
FIG. 1(A) shows a diagram showing the main linkages of a weigh bucket weigh system according to an embodiment of the invention.

Embodiments of the invention are directed to systems and methods for weighing crops. The systems and methods can be used to weigh crops such as tomatoes. In preferred embodiments, the systems and methods can be used to weigh crops from trees. Crops from trees include, but are not limited to nuts (e.g., pistachios, almonds), fruit (e.g., oranges, apples, etc.) and the like.

Embodiments of the invention are particularly useful for creating yield maps for crops from trees. Mapping crop yields from trees in an orchard can show changes such as changes in soil, genetic changes, etc. Correlating observed yield trends with changes in soil type, irrigation system design, planting patterns, management practices, rootstock, genetic background, and other environmental, management and genetic variables provides a unique capability to determine the cause of yield variation while providing the information required to optimize productivity and management.

Previously, many thought that creating yield maps of individual trees in an orchard was not achievable without increasing costs or was undesirable because such yield maps were perceived to be of little value. For example, harvesting costs are the largest component of most tree crop costs, and weighing harvested crops from trees to create yield maps was expected to decrease harvesting speed. However, embodiments of the invention can create an accurate yield map of trees in an orchard without substantially affecting harvesting time. In another example, many thought that there was little variation of tree yield in an orchard so that many thought that yield maps for trees would have little value. However, the present inventors have shown below that there are yield variations in trees in an orchard, and that it is advantageous to identify any yield variations to maximize crop yields.

The capacity to determine the yield of individual plants in the field provides the ability to simultaneously determine the genetic, environmental and management contributions to yield. This is unique and is not currently possible under any existing application of precision harvesting technology. Knowledge of the contribution of each of these factors to yield greatly enhances the management choices for yield optimization.

Embodiments of the invention include methods and systems that are used to create yield maps for orchards. In one embodiment, the method comprises: (a) harvesting a crop from a tree in the orchard; (b) automatically loading the harvested crop (e.g., nuts) into a weighing container; (c) automatically weighing the harvested crop in the weighing container; (d) automatically unloading the weighed crop in (c) (for example, in a second weighing container or in a bind of a truck); (e) repeating steps (a)–(d); and (f) creating a yield map of the orchard after (e). The yield map may contain yield information about every tree in an orchard. The yield map may be automatically generated by a computer.

The system that is used to create the yield map comprises a container, and a crop transport apparatus adapted to feed crops into the container. A load cell is coupled to the container and is used to determine the weight of the crops in the container. A computer system is used for (i) controlling the movement of the container for loading and unloading of crops in the container, (ii) controlling the movement of the crop transport apparatus, and (iii) recording the weight of crops inside of the container. An optional protective frame may be around the container to prevent it from being contacted by tree branches and the like.

The crop transport apparatus may comprise any suitable apparatus used to transport crops. Such apparatuses may include an elevator, a conveyor belt, etc. Elevators, and conveyor belts may form part of a harvester.

The computer may include any commercially available computing apparatus (e.g., a personal computer). It can be used to control the various components of the system so that the system can run automatically. It can also be used to automatically create and store yield maps and generate other data. A data storage medium in the form of a computer readable medium may be coupled to the computer or reside in the computer. The data storage medium (e.g., a hard disk, database server, etc.) can be used to store yield data, and can be used to store code for controlling any of the components of the system so that the system is partially or fully automated.

In embodiments of the invention, the container is a bucket that is electronically operated. The electronic weigh bucket can be compact, convenient to use, and relatively inexpensive. It can also provide a convenient way of calibrating crop load and/or yield monitors. Moreover, such an electronic weigh bucket may provide a convenient way to measure individual tree yields. Yields vary dramatically from tree to tree within an orchard making accurate fertilizer recommendations difficult. If yield information is available on a per tree basis, tree-specific input management is possible to maximize yield, minimize inputs, and/or reduce environmental impact. In pistachio production systems, for example, the ability to map yield in an orchard and to use that information to optimize inputs would revolutionize that tree crop industry. Additional details about the electronic weight bucket are provided below.

I. Electronic Weigh Bucket Design

Batch Weighing: Since there is a considerable transport lag of the crop inside harvesters, a yield monitor system does not necessarily have to measure the weight of the fruits instantaneously. Thus, the transport lag time can be utilized in accumulating the crop in the harvester and then weighing the fruits in the batches. This mechanically integrated periodic weighing of the fruits can become less noisy when compared with instantaneous sensing of small partitions of the yield. The inventive system incorporates this concept. The mass flow being harvested can be periodically weighted in batches and reported at time intervals smaller than the harvester transport lag time. There is, however, a compromise between the time lag and the volume of the reservoir needed to temporarily store the crops.

The batch weighing sequence adopted in embodiments of the invention may include: (a) loading a crop into a container using a crop transport apparatus; (b) temporarily stopping the crop transport apparatus from loading the crop into the container; (c) weighing the crop using the container; (d) unloading the weighed crop from the container by automatically manipulating the container; and (e) repeating steps (a)–(d). Illustratively, for a 0.3 m bucket radius, weigh bucket discharge frequencies can be between about 30 to 60 rpm.

In a specific embodiment, the method includes a) loading fruits of a tree in an orchard into a bucket with a feeding conveyor; b) temporarily stopping a feeding conveyor; c) weighing the bucket with fruits; d) unloading the fruits from the bucket; and e) repeating steps a)–d). The cycling process can be repeated for every tree harvested.

Figure 1B:
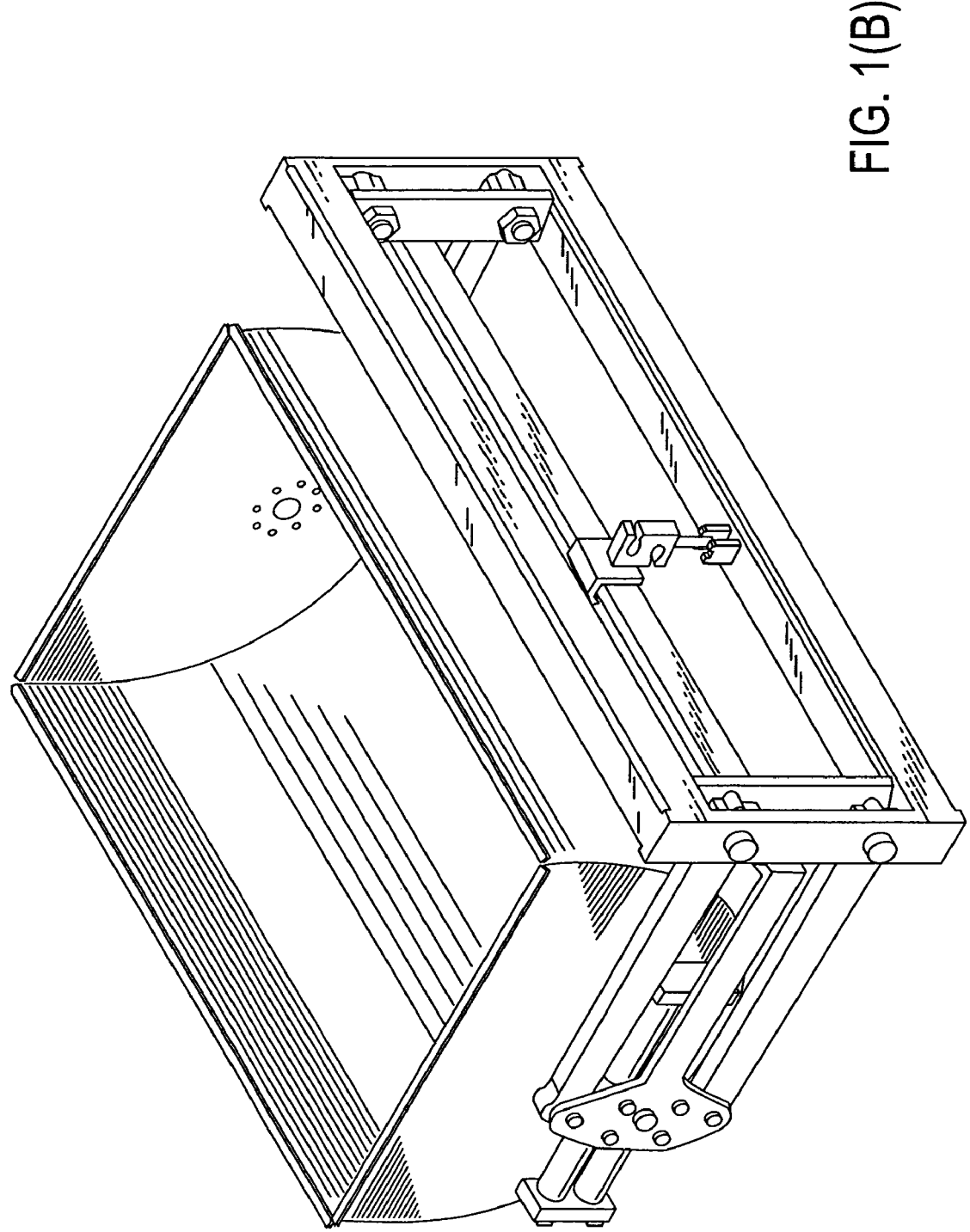
FIG. 1(B) shows a perspective view of a weigh bucket system according to an embodiment of the invention.

Linkages: FIG. 1(A) shows a diagram with the main linkages of the weigh system. The combination of the load cell and the linkage mechanisms is designed to sense the bucket weight (in the vertical direction), while avoiding errors caused by the cross-sensitivity of the load cell to loads actuating from other directions. The tie rods b–c and b*–c* are rigidly linked by a tie bar e–e*. The tie rods b–c and b*–c* support the weigh bucket along with the bucket index drive unit. This configuration leads to two four-bar linkages, one on each side of the weigh bucket, which are represented as linkages a–b, b–c, c–d and a*–b*, b*–c*, c*–d* in FIG. 1(A). The weigh bucket can rotate along a direction passing through point e and e*. FIG. 1(B) shows a perspective view of a weigh bucket design according to an embodiment of the invention.

The weigh unit is able to obtain a tarred weight and the weight of the unit filled up with fruits (or other crops) for every cycle. Two symmetrically mounted and parallel floating mechanisms, solidly connected through the tie bar e–e*, are combined with a single pivoted load cell (at points f and g) to measure the load. This combination considerably simplifies the weigh unit. Points a, b, c, d and a*, b*, c*, d* represent pivots free to rotate in the plane containing the four-bar linkages. The system is designed to absorb any moments and forces produced by any direction other than the vertical direction, and still transfer the load to the load cell. A single load cell then becomes sufficient to measure the remaining force, i.e., the vertical reaction corresponding to the weight of the weigh bucket. Thus, any off-set of the fruit load, as well as the torque reaction produced by the bucket drive unit, will be absorbed by the linkages without being sensed by the load cell. The total amount of error estimated due to friction of the pivots (lubricated bushings) accounts for an error of less than 0.3% of the total load. The semicircular shape of the bucket also helps to keep fed fruits (or other crops) close to the bucket centerline; thus minimizing offset loading effects. The bucket center of rotation is determined at the center of mass of the fully loaded bucket to improve power requirements and minimize loads on the linkages.

Index Drive Unit: The bucket drive unit is composed of a wrap spring clutch driven by a hydraulic motor. Using the hydraulic motor to direct indexing the bucket becomes involving because of the intermittent nature of the process and the elasticity of its hydraulic lines. It operates to allow the bucket to turn 360 degrees for fruit unloading and return back to the feeding and weighing position, quickly and accurately.

The wrap spring clutch/brake is an economical solution for, rapid cycling and accurate positioning. The wrap spring clutch operates from a single DC pulse, stopping the load within ±½ degrees noncumulative. Some applications of the wrap spring clutch are in, the food industry (i.e., egg packing), bag making, paper feed, mail openers, conveyor drives, metal stapling, and rapid cycling equipment. The engagement and disengagement of the clutch is controlled by a solenoid mechanism activated by an electrical pulse.

Data Acquisition: The use of a single load cell simplifies the electronic data acquisition system. In addition, the weigh bucket system can include an angle transducer with an internal temperature sensor incorporated in its casing. Because the angle sensor is sensitive to temperature changes, the temperature sensor is used to correct the angle sensor readings. The angle transducer is used to correct the load cell readings since the inclination of the weigh bucket, which is mounted, for example, on the tomato harvester elevator, changes continuously. Low pass filters were incorporated in the electronic circuit to avoid aliasing. The signal sensed by the load cell was amplified, filtered, and interfaced to an A/D converter. The signal was sampled at a rate of 100 Hz and stored in a data-logger. Both the load cell and angle sensor signals were filtered and an average of 100 points was obtained. Excessive signal filtering or averaging may create undesirable signal shifting in time. Similar weigh predictions resulted by averaging the signal, or by using a Butterworth 9th order digital filter. These findings are consistent with the literature (Durrence, J. S. et al., *Precision Agriculture* 1:301–317 (1999)). Therefore, averaging the signal was preferable.

Unloading: The discharge duration of the fruits (or other crops) that were already weighed can be approximated by a body free fall theory, if the friction between the bucket and fruits (or other crops) is negligible. Therefore, the maximum cycling frequency F [rpm] the bucket will be allowed to turn without re-feeding its fruit (or other crops) contents will be $F=60/(2*h/g)^{0.5}$, where h [m] is the radius of the bucket and g is the acceleration of gravity [m/s$^2$]. For a 0.3 m bucket radius the frequency F will be 240 rpm.

II. Electronic Weigh Bucket Description of Operation

Some examples provided below refer to the weighing of tomatoes and pistachios. It is understood that embodiments of the invention are not limited to these crops.

A. Weighing Tomatoes

Figure 2:
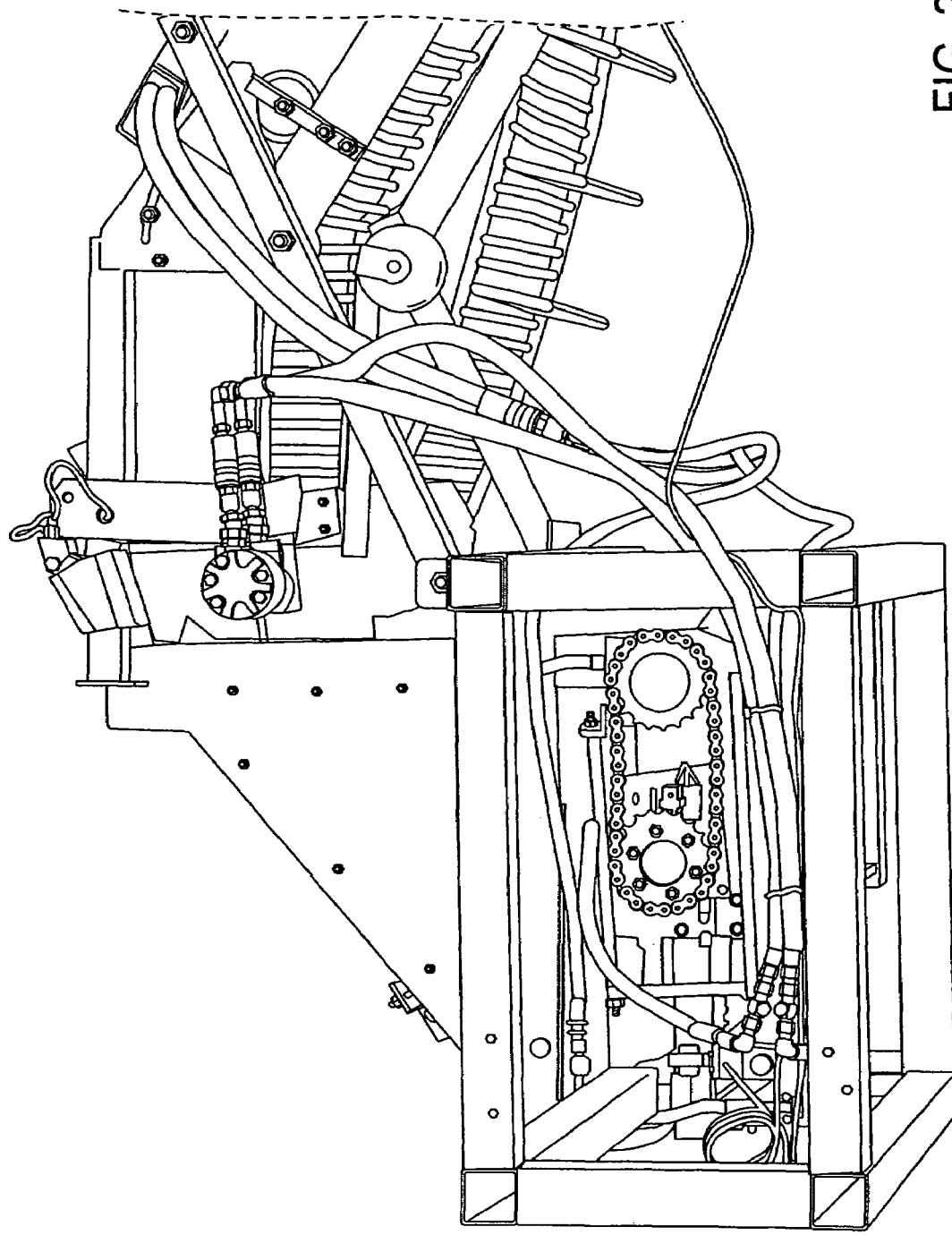
FIG. 2 shows an overview of an electronic weigh bucket (EWB) mounted on the boom elevator of a tomato harvester. An optional external tubular frame was added to avoid accidental contact of the EWB with other objects during a regular harvesting operation.

An electronic weigh bucket system was designed and retrofitted onto a Johnson tomato harvester owned by Button and Turkovich Ranch, Winters, Calif. The system was attached to the end of the tomato harvester boom elevator as shown in FIG. 2. This device collects the tomatoes as they fall off the boom elevator, weighs them, and then dumps them onto the truck.

Figure 3:
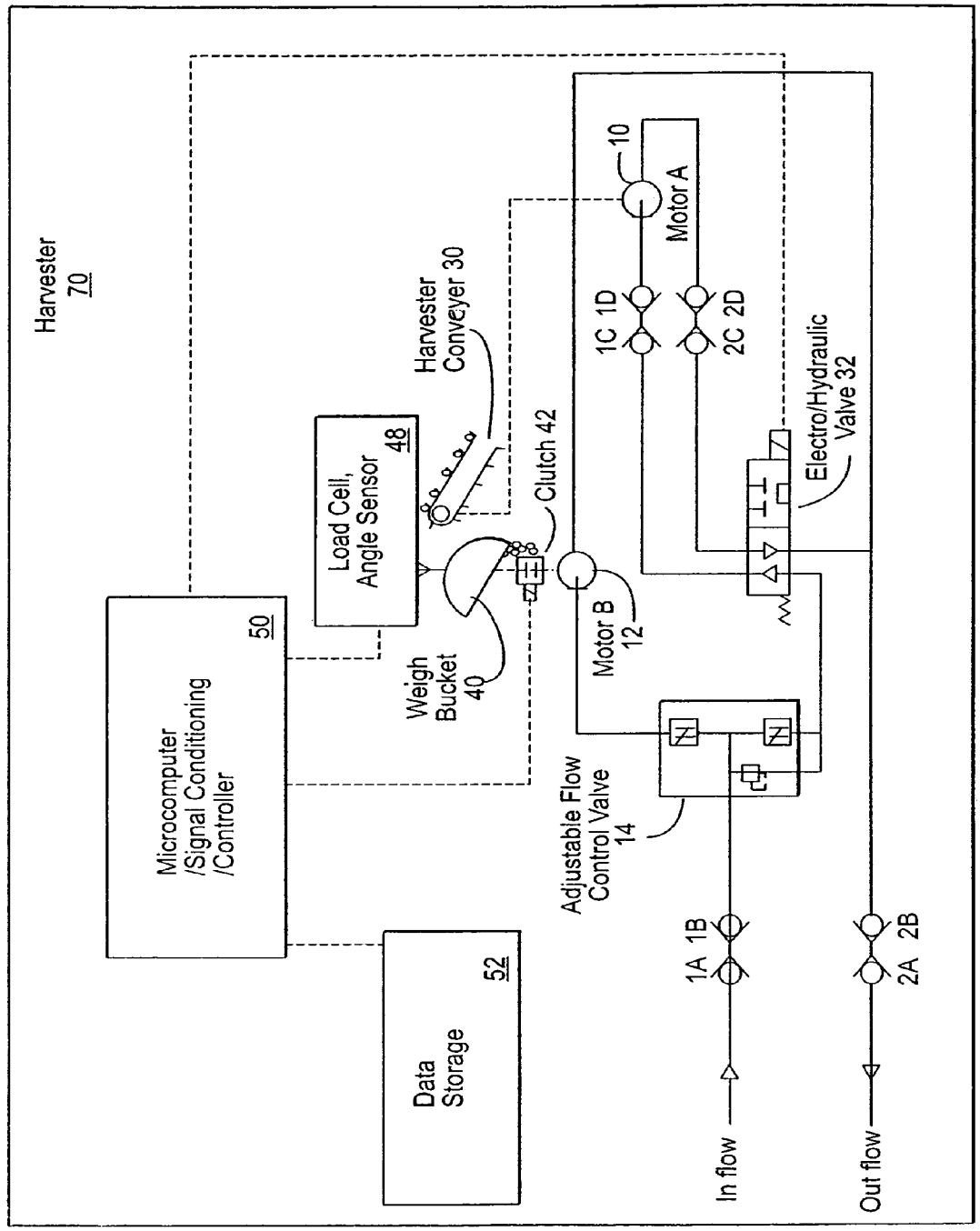
FIG. 3 shows a schematic diagram of the electronic and hydraulic circuits employed in an electronic weigh bucket system.

FIG. 3 shows the schematic diagram of the electronic and hydraulic circuits employed in the weigh bucket system. In the standard hydraulic system of the tomato harvester 70, the inflow oil coming from the harvester hydraulic line powers motor A 10 drives the harvester conveyor 30 and then returns to the harvester hydraulic circuit. The hydraulic system consists of the boom elevator motor (shown as motor B 12 in FIG. 3) and a new hydraulic motor which powers the weigh bucket (shown as motor A 10 in FIG. 3) along with an adjustable flow control valve 14 and an electrohydraulic valve 32. Quick couplers are used to connect this circuit to the existing boom elevator drive circuit on the harvester 70. Moreover, the weigh bucket drive motor is included in the circuit shown in FIG. 3 using quick couplers.

In operation, an adjustable flow control valve 14 sends a part of the flow to the boom elevator motor (motor A 10) and the rest of the oil to the weigh bucket motor (motor B 12). The angular speed of motor B 12 can be adjusted in the range of 30 to 60 rpm. The boom elevator motor 10 is "on" unless the electrohydraulic valve cuts the flow to this motor. The boom elevator motor 10 is stopped when the weigh bucket empties. The electrohydraulic valve 32 can be energized to cut the flow out to the boom elevator motor 10 automatically at regular intervals or can be a manually operated switch using a microcomputer 50. The weigh bucket motor 12 can always be on. However, the weigh bucket shaft is isolated from this motor 12 by a solenoid-actuated clutch 42. When the solenoid-actuated clutch 42 is energized, the motor engages the weigh bucket shaft and the weigh bucket 40 rotates. Thus, when the solenoid is "off", the weigh bucket 40 is stationary and the boom elevator empties tomatoes into it. When the solenoid is turned "on", the weigh bucket 40 rotates and dumps the tomatoes onto the truck. The weight and the inclination of the weigh bucket frame are continuously measured by a load cell and an angle sensor 48. A temperature sensor is also included to implement temperature compensation, since the angle sensor was found to be sensitive to temperature. The microcomputer 50 continuously records weight, angle, and temperature data and stores it on a storage device 52. The microcomputer 50 also generates signals to energize the solenoid-actuated clutch 42 and electrohydraulic valve 32 as mentioned earlier.

Figure 4:
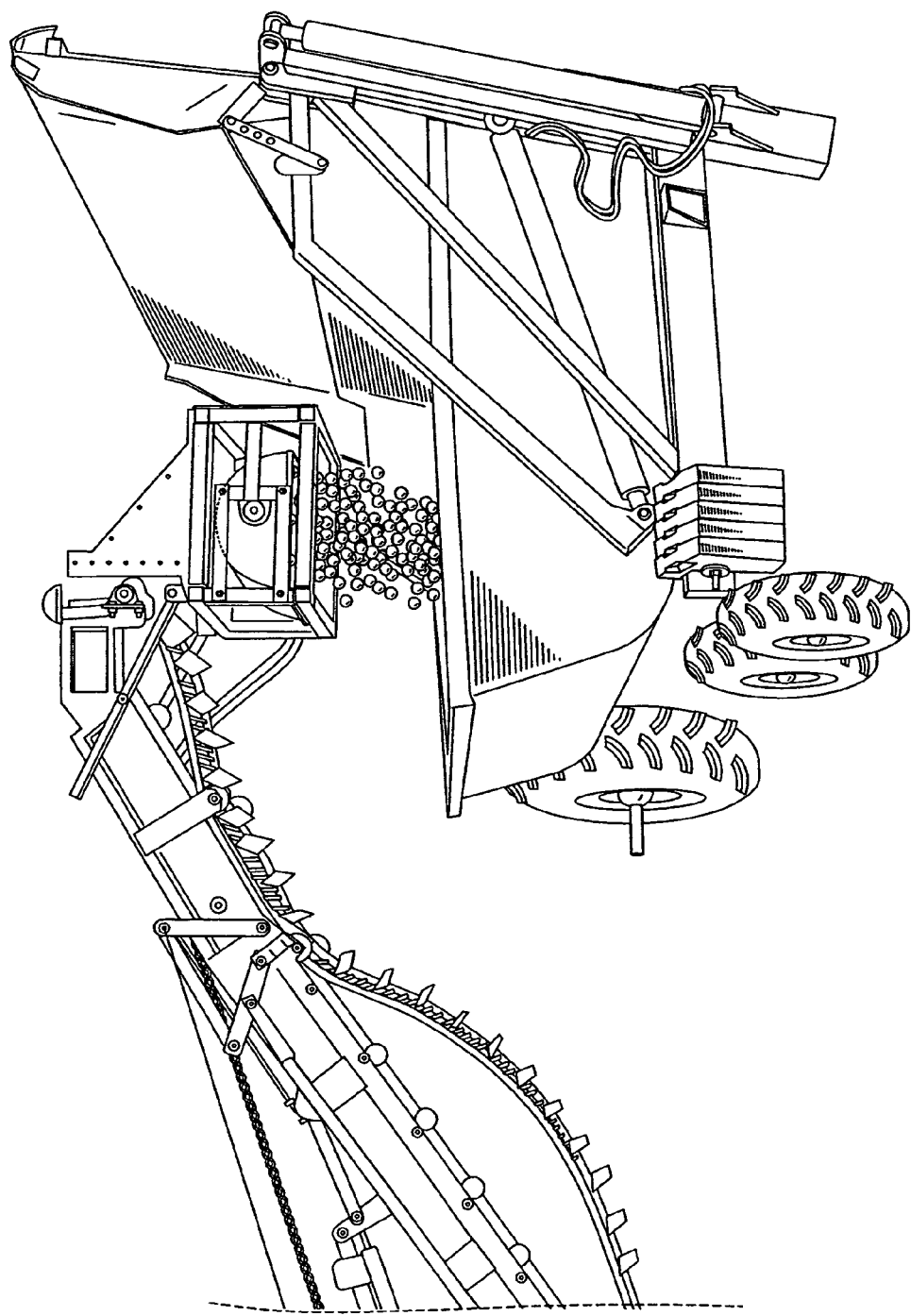
FIG. 4 shows the electronic weigh bucket as it empties completely.

The sequence of operation during any given loading-unloading cycle starting with an empty bucket is as follows:
i) The tomatoes from the boom elevator empty onto the weigh bucket. During this event, the weigh bucket is positioned to receive tomatoes from the boom elevator (i.e., it is in "fill" position). This "fill" time may be manually controlled by the operator by judging how full the weigh bucket is, or it can be preset when the system is operating in the automatic mode. Typically, the filling time is about two seconds. The boom elevator motor is "on" during this event and the electrohydraulic valve is "off" (FIG. 2).
ii) When the weigh wagon is ready to be emptied, the electrohydraulic valve cuts the hydraulic oil flow to the boom elevator. The boom elevator then stops.
iii) The solenoid-actuated clutch is engaged and the weigh bucket is emptied on to the truck (FIG. 4).
iv) The solenoid-actuated clutch is disengaged when the bucket returns to the "fill" position.
v) The solenoid-actuated hydraulic valve opens and the hydraulic oil flow resumes to the boom elevator motor. The boom elevator starts and begins to empty tomatoes onto the weigh bucket, once again.

Figure 5:
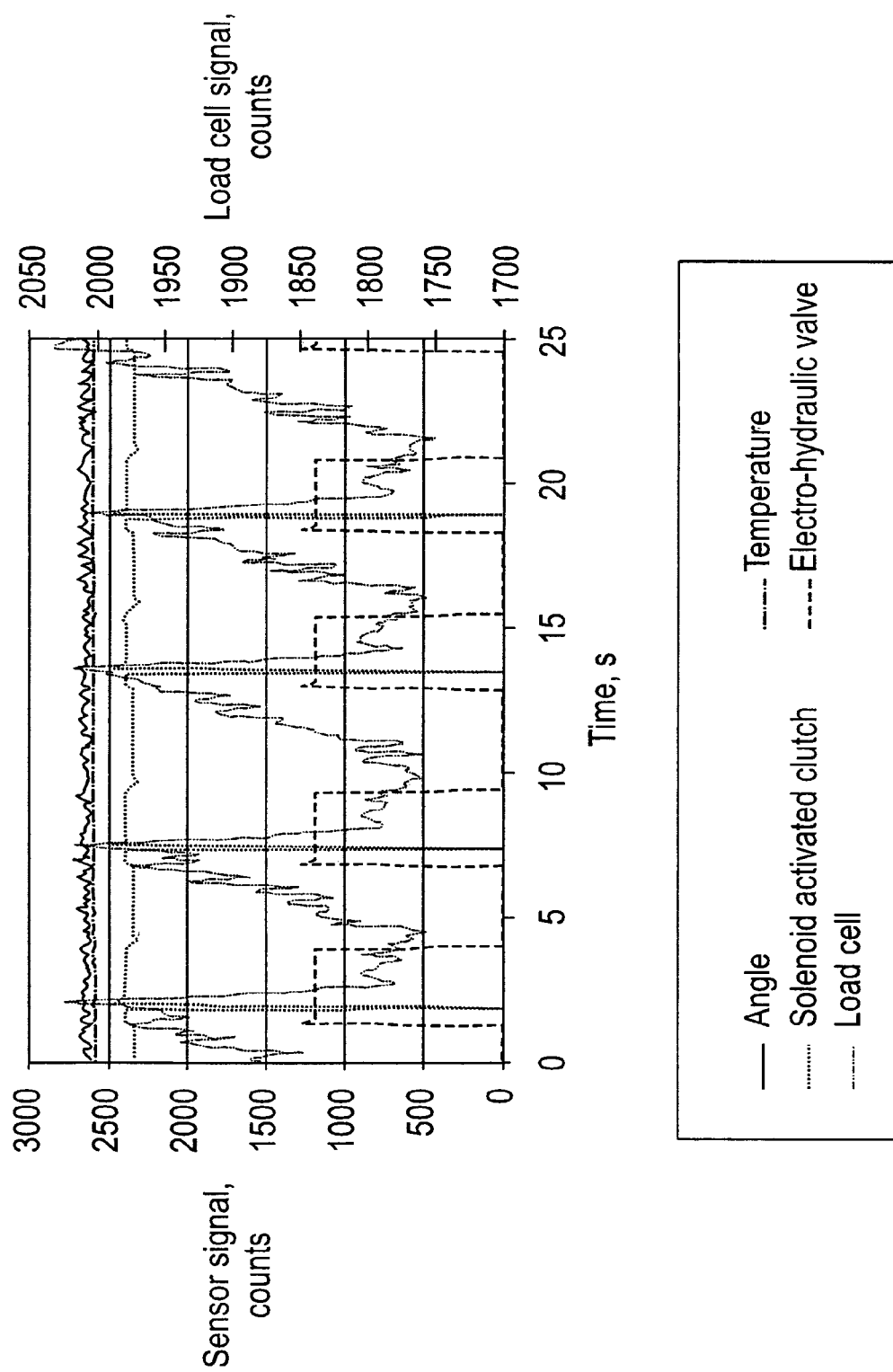
FIG. 5 shows typical data generated during the operation of the weigh bucket.

FIG. 5 shows typical data recorded during the operation of the weigh bucket. The angle and temperature signals did not change in this sampled period. From time zero until about one and a half seconds, the load cell signal shows the bucket weight increasing. The conveyor belt is running, controlled by the electrohydraulic valve, and the solenoid-activated clutch is disengaged. For the next 0.6 seconds, the fruits are weighed while the clutch and the conveyor are not running. Then, a pulse is sent to the solenoid clutch and it starts turning to unload the bucket. At four seconds after start, the bucket is empty, and an on-the-fly tare value of the load cell can be obtained. A tare value of the system is usually obtained at the start. The conveyor starts running again, the clutch rests at the indexed position (to receive tomatoes), more tomatoes are loaded into the-bucket and a similar cycling continues.

While working in the auto mode and using the methods and systems described above, a tomato harvester retrofit with the weigh bucket can operate at an estimated ground speed of 3.2 km/h. The validation data set consisted of 16 individual bucket weigh measurements and the validation data set consisted of 17 weigh measurements. The weigh bucket calibration data and the validation data are discussed in U.S. Provisional Application No. 60/489,584, filed on Jul. 22, 2003. Table 1 shows the results of weigh bucket predictions. The weigh bucket measured 19 row segments of approximately 33 m in length. The 20th segment consisted of 1600 m in length. These initial results demonstrate the weigh bucket presented reasonably good ability to measure tomato weight.

TABLE 1

Results of predicted and true weight obtained for 20 field segments

| Segment | Predicted weight, lb | True weight, lb | Error % |
|---|---|---|---|
| 1 | 1205 | 1228 | −1.84 |
| 2 | 1348 | 1292 | 4.30 |
| 3 | 1397 | 1410 | −0.92 |
| 4 | 1196 | 1208 | −0.96 |
| 5 | 1446 | 1414 | 2.23 |
| 6 | 1456 | 1436 | 1.40 |
| 7 | 1325 | 1388 | −4.54 |
| 8 | 245 | 252 | −2.89 |
| 9 | 1284 | 1226 | 4.74 |
| 10 | 1093 | 1084 | 0.85 |
| 11 | 1191 | 1170 | 1.79 |
| 12 | 1138 | 1074 | 5.98 |
| 13 | 1052 | 1026 | 2.55 |
| 14 | 1155 | 1148 | 0.63 |
| 15 | 1304 | 1272 | 2.53 |
| 16 | 1220 | 1204 | 1.36 |
| 17 | 1213 | 1186 | 2.28 |
| 18 | 1123 | 1098 | 2.30 |
| 19 | 1001 | 974 | 2.74 |
| 20 | 6259 | 6144 | 1.87 |

B. Weighing Pistachios

1. Weighing Systems for Weighing Pistachios

An electronic weigh bucket system was designed and retrofitted onto a Weldcraft harvester owned by Paramount Farming Company, Lost Hills, Calif. The system was attached to a trailer that the feeding conveyor dumped into as shown in FIG. 6(A). The pistachio yield monitor collects the nuts as they fall off the feeding conveyor, weighs them, and then dumps them into the trailer.

FIG. 3 shows the schematic diagram of the electronic and hydraulic circuits employed in the weigh bucket system. The system has been described above with respect to tomatoes, and is described in further detail below in the context of pistachios.

Figure 6B:
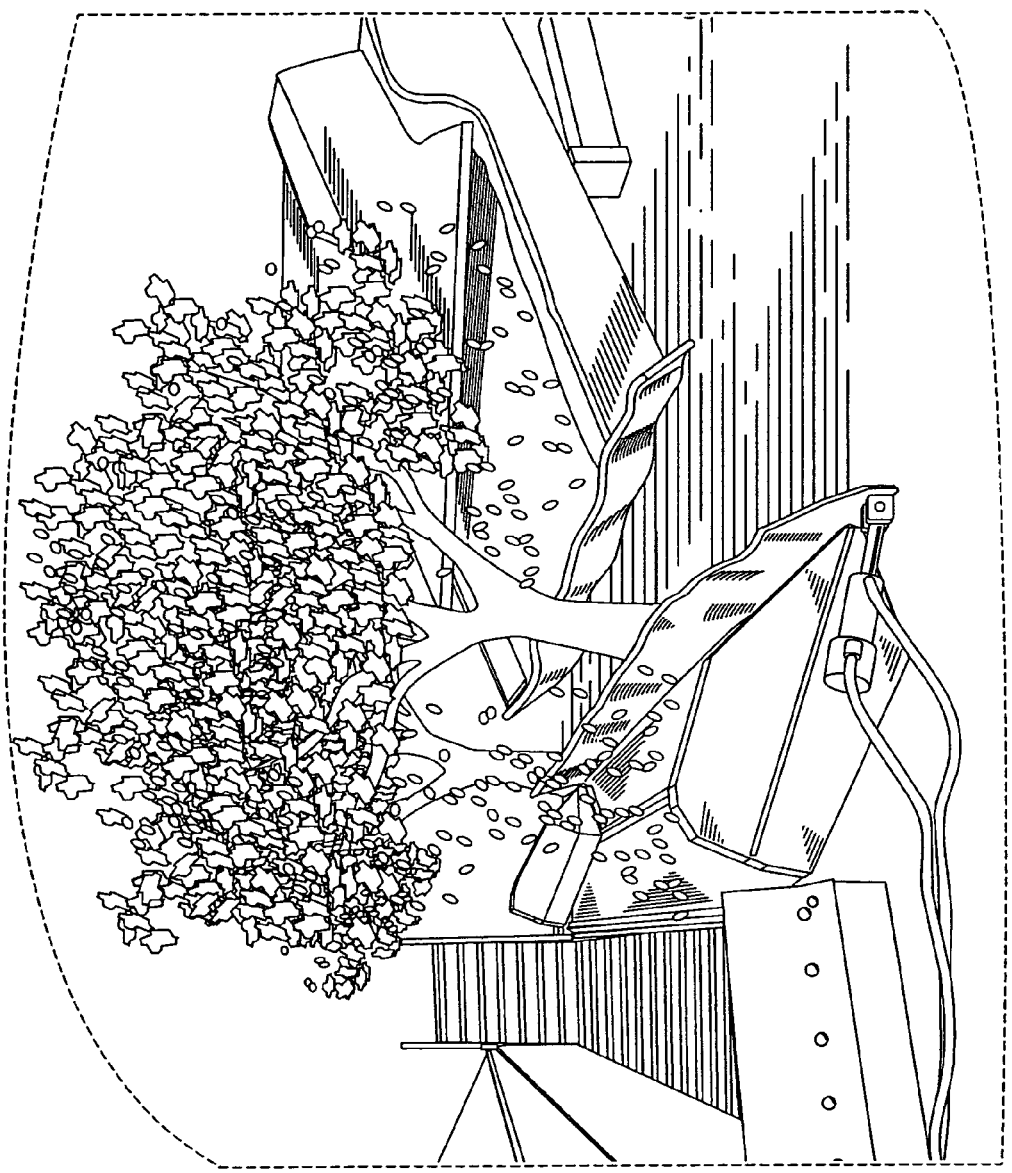
FIG. 6(B) shows a set of Weldcraft harvesters.

Operation: Referring to FIG. 3, an adjustable flow control valve sends part of the flow to the conveyor motor (motor A) 10 and the rest of the oil to weigh bucket motor (motor B) 12. The angular speed of motor B can be adjusted in the range of 30 to 60 rpm. The conveyor motor 10 is "on" unless the electro-hydraulic valve 32 cuts the flow that occurs to this motor. The conveyor motor 10 is stopped when the weigh bucket 40 empties. The electro-hydraulic valve 32 can be energized to cut the flow out to the conveyor motor 10 automatically when the pan of the catching frame is raised via a magnetic pick up switch connected to the microcomputer 50. (FIG. 6(B) shows the pan of the Weldcraft catching frame.) The weigh bucket motor 12 can be always on. However, the weigh bucket shaft is isolated from this motor by a solenoid actuated clutch. When the solenoid actuated clutch is energized, the motor engages the weigh bucket shaft and the weigh bucket rotates. Thus, when the solenoid is "off", weigh bucket is stationary and feeding conveyor empties nuts into it. When the solenoid is turned "on", the weigh bucket 40 rotates and dumps the nuts into the trailer. The weight of the weigh bucket 40 is continuously measured by a load cell. Through static calibration, it was determined that there were minimal temperature effects on the circuitry.

Figure 7:
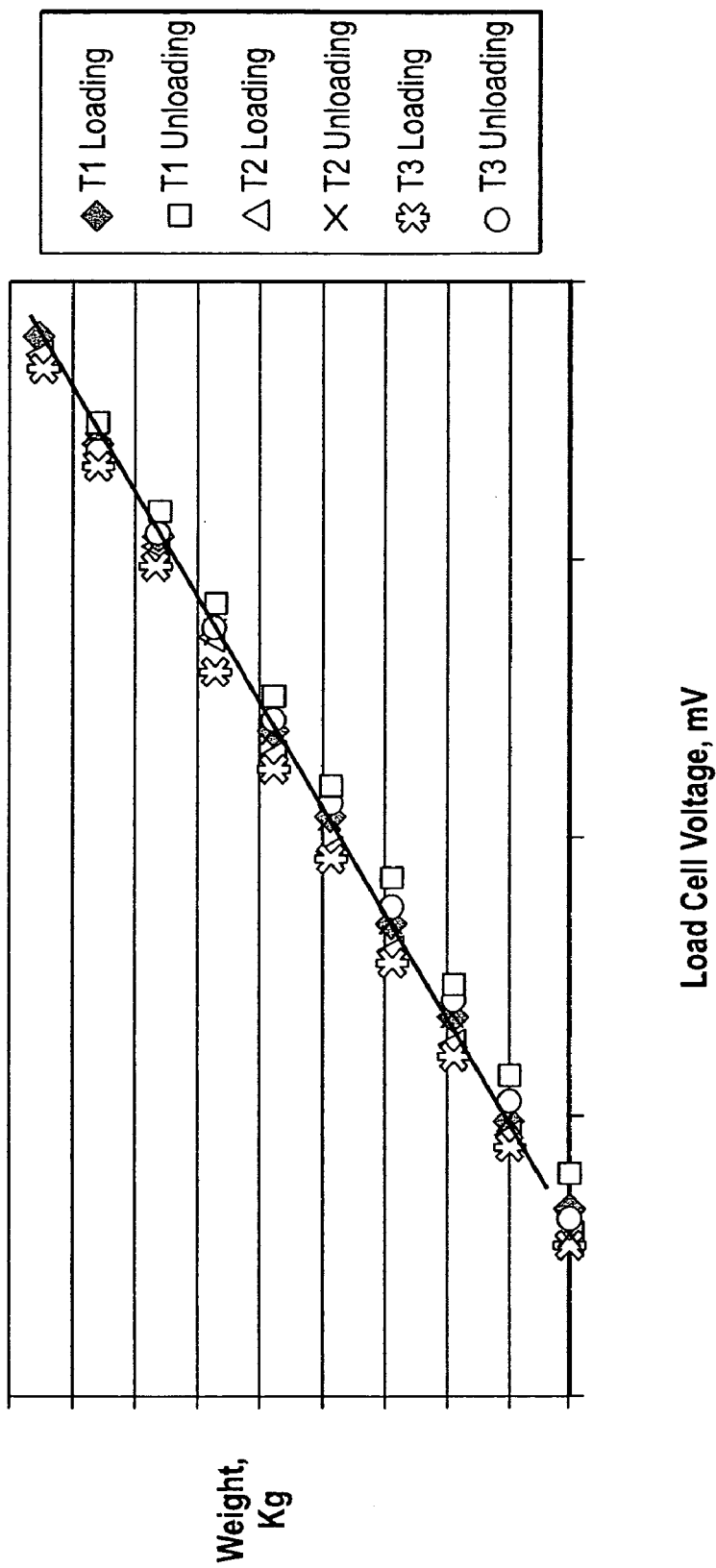
FIG. 7 shows the results of a static calibration process performed at three temperatures (T1=21.8 C, T2=35.6 C, & T3=32.3 C).
Figure 8:
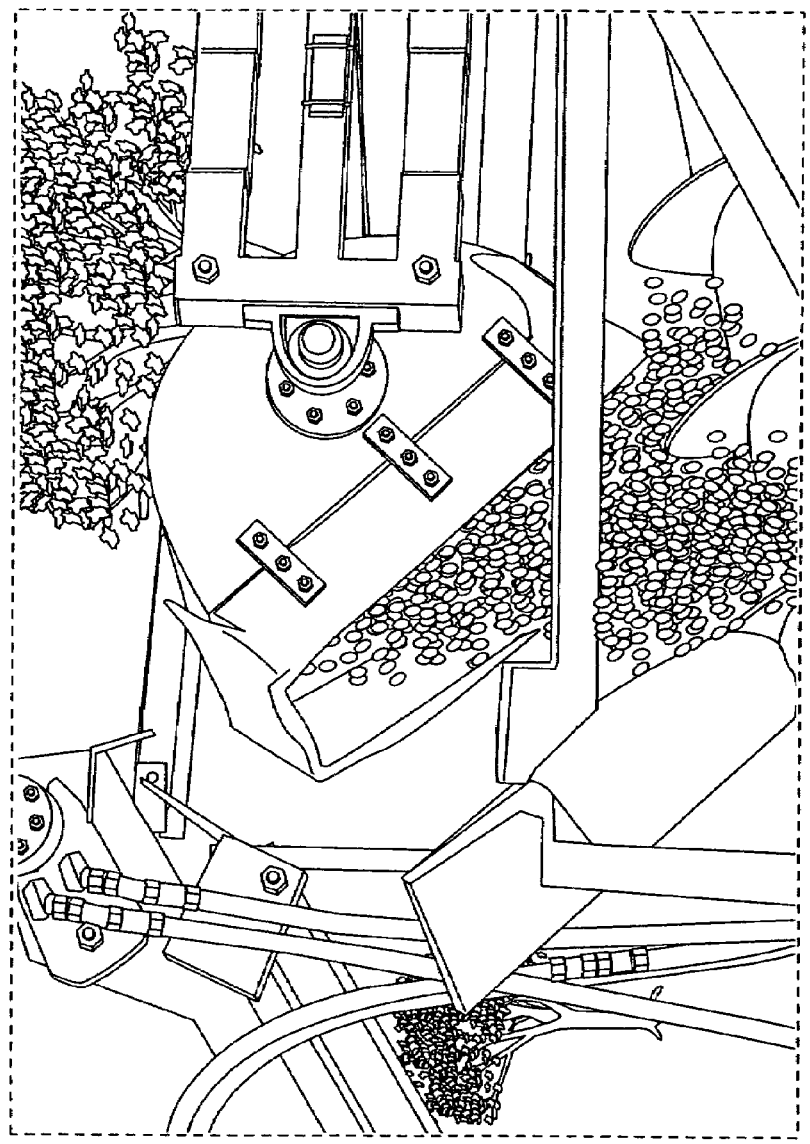
FIG. 8 shows a pistachio yield monitor dumping pistachios into a trailer.

FIG. 7 shows the static calibrations done at three temperatures. The charts show the minimal temperature effects on the filter, amplifier circuit used with the load cell. Temperature should not cause a problem in measuring the weight of the yield due to the short duration of time in which the weight is being recorded. On average, it takes approximately ten seconds to harvest a tree. During this time, the temperature effects can be minimized by taring the system and taking the difference between the maximum load cell value and the baseline value. A microcomputer continuously records weight, and radar signal data, and manual switch pulses and stores them on a storage device, and it also generates signals to energize the solenoid actuated clutch and the electro-hydraulic valve as mentioned earlier. The sequence of operation during any given loading-unloading cycle starting with an empty bucket is as follows:

i) The nuts from the feeding conveyor empty into the weigh bucket. During this event, weigh bucket is positioned to receive nuts from the feeding conveyor (i.e., it is in "fill" position). This "fill" time may be manually controlled by the operator by judging how full the weigh bucket is. Otherwise, the bucket will dump as the pan of the catching frame is lifted such as it is after a tree is harvested. The feeding conveyor motor is "on" during this event and the electro-hydraulic valve is "off" during this event. The system was able to clear all of the nuts from a tree from the conveyor into the pistachio yield monitor before the next tree is harvested.

ii) When the pistachio yield monitor is ready to be emptied, the electro-hydraulic valve cuts the hydraulic oil flow to the feeding conveyor motor. The conveyor then stops.

iii) The solenoid-actuated clutch is engaged and the weigh bucket is emptied into the trailer (FIG. 8).

iv) The solenoid-actuated clutch is disengaged when the bucket returns to the "fill" position.

v) The solenoid actuated hydraulic valve opens and the hydraulic oil flow resumes to the feeding conveyor motor. The conveyor starts and begins to empty pistachios into the weigh bucket, once again.

Figure 9:
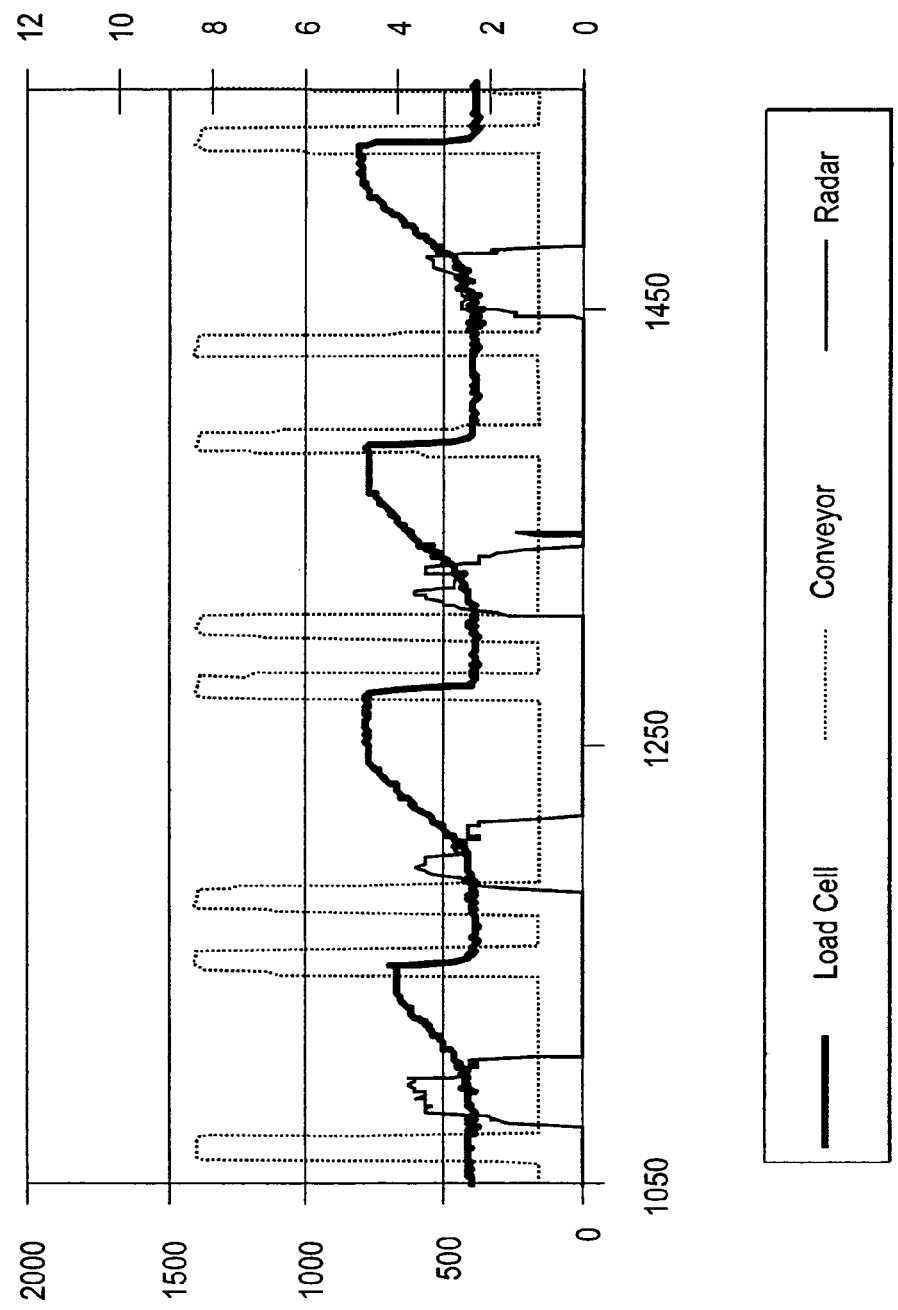
FIG. 9 shows typical data generated during the operation of the weigh bucket.

FIG. 9 shows typical data recorded during the operation of the pistachio yield monitor. The three signals on the chart are the load cell, conveyor, and the radar signal. The radar is used in conjunction with the manual switch, or conveyor, signal to associate a specific yield to a specific tree. If the radar signal is zero, or low, this indicates that the harvester is not moving and is in a position to harvest a tree. The manual switch signal indicates that the bucket was dumped by the operator, or if it is still in the fill position. A program was written in Excel to process the data. Trees were identified in the program when the radar signal was low and if a dump occurred. If the radar signal was high for an extended amount of time without a dump, then this would indicate that a tree was skipped. Harvested trees were recorded by hand in order to cross reference the system data and to make sure they corresponded to one another. The conveyor signal is the voltage spike that occurs when the manual switch is activated by the operator when the pan is raised.

At the beginning of the data set in FIG. 9, there is a spike in the conveyor indicating that the bucket has indexed, or dumped. This spike is then followed by a spike in the radar signal which indicates that the harvester was in motion. Once the radar signal goes low, the load cell signal begins to increase. A tare value is obtained after the bucket is indexed. The tare value is then compared to the maximum value obtained just before the next index point and the difference in values represents the yield value for the given tree. The low radar signal indicates that the harvester has stopped, or is decelerating, and ready to harvest the next tree. The increasing load cell signal is the result of the pistachio yield monitor filling up with that next tree's yield. Once that tree is finished being harvested, there is a spike in the conveyor signal indicating another indexing followed by a spike in the radar signal. There are 2 conveyor signals. This is a result of the operator choosing to hit the manual dump switch an extra time to ensure that the bucket was empty. This second dump does not have to be done, but the operator was comfortable with his harvesting routine.

2. Pistachio Orchard Verification

Figure 10:
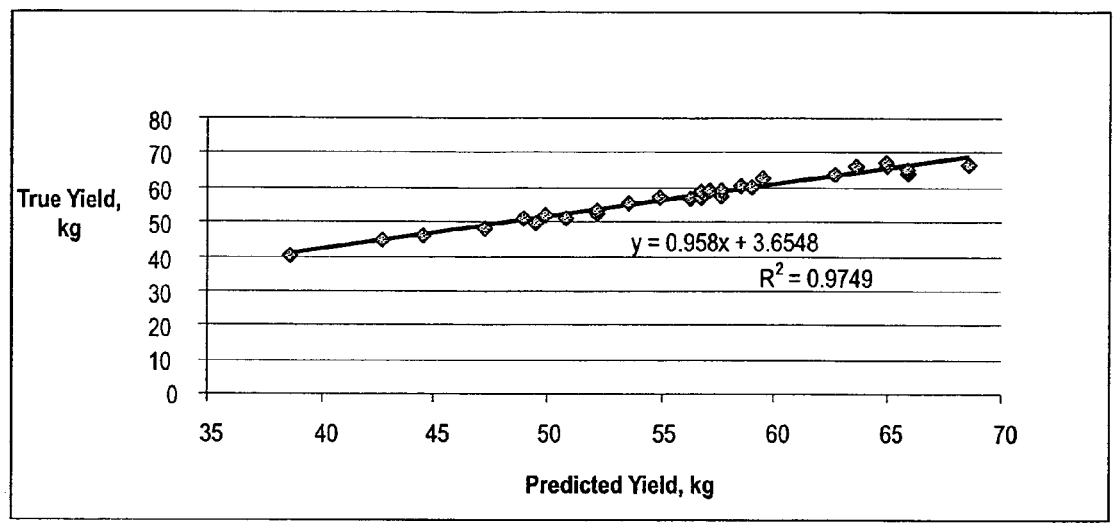
FIG. 10 shows the results of a validation performed of weigh bucket predicted weight versus true weight as determined from weighing sacks of pistachios with a scale.

The electronic weigh bucket was installed on a pistachio harvesting equipment to demonstrate its potential to measure and map yield in a pistachio orchard. The weigh bucket receives the nuts delivered from the pistachio harvester conveyor and dumps them into a trailer. An area of 80 acres was selected in a pistachio field at Paramount Farming Company, Lost Hills, Calif. Each row consisted of 151 trees spaced at an approximate 5 m by 5 m grid. The weigh bucket was statically calibrated by filling it up with incremental weighed amounts from 0 to 70 kg. The pistachio yield monitor was incrementally loaded and unloaded at three different temperatures in order to study the temperature effects. Once in the field, a validation was performed by collecting all of the nuts from a tree, weighing them by hand with a spring scale, and then dumping the nuts into the pistachio yield monitor. The scale values are assumed to be the true weight and the pistachio yield monitor values are the predicted weights. This was done for 30 consecutive trees in the orchard and the results are displayed in FIG. 10. One weigh cycle was usually sufficient to weigh the yield of a tree.

3. Pistachios Study Results

An earlier design of the pistachio yield monitor used a Halsey harvester which had a transport lag of approximately 5 trees. Typically about 10 seconds are spent to harvest individual trees and it takes up to a minute for all nuts to be completely cleared from the conveyor for a single tree. This problem was solved with when Paramount Farming Company switched to Weldcraft harvesters, which had faster conveyor speed capabilities and could effectively move any nuts in the conveyor to the trailer in less than 10 seconds. This resulted in no mixing of yield from one tree to the next and did not significantly slow normal harvesting speed.

Figure 11:
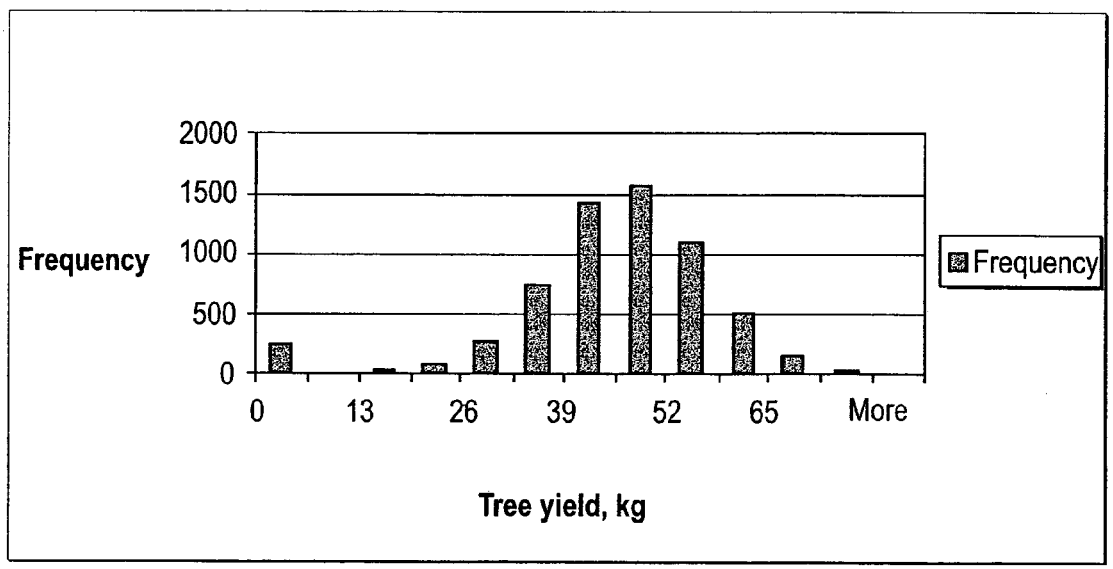
FIG. 11 shows a histogram showing the frequency of yield occurrence for 6000 trees surveyed in a pistachio orchard.
Figure 12:
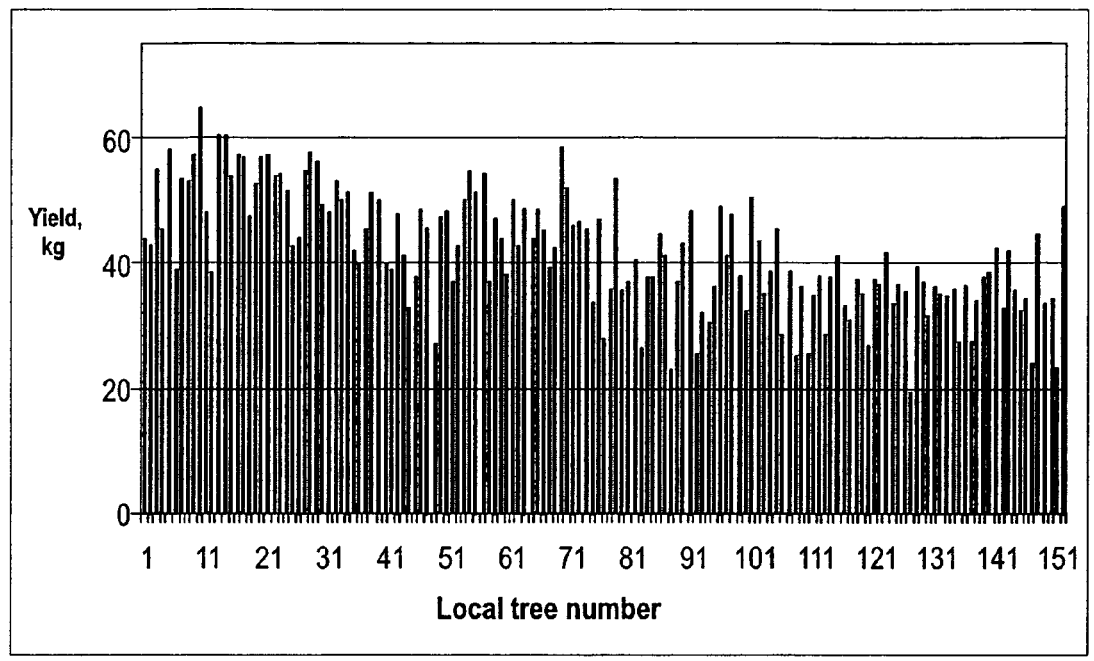
FIG. 12 shows pistachio tree yields measured with the weigh bucket in a continuous row containing 151 trees spaced at approximately 5 m intervals.
Figure 13:
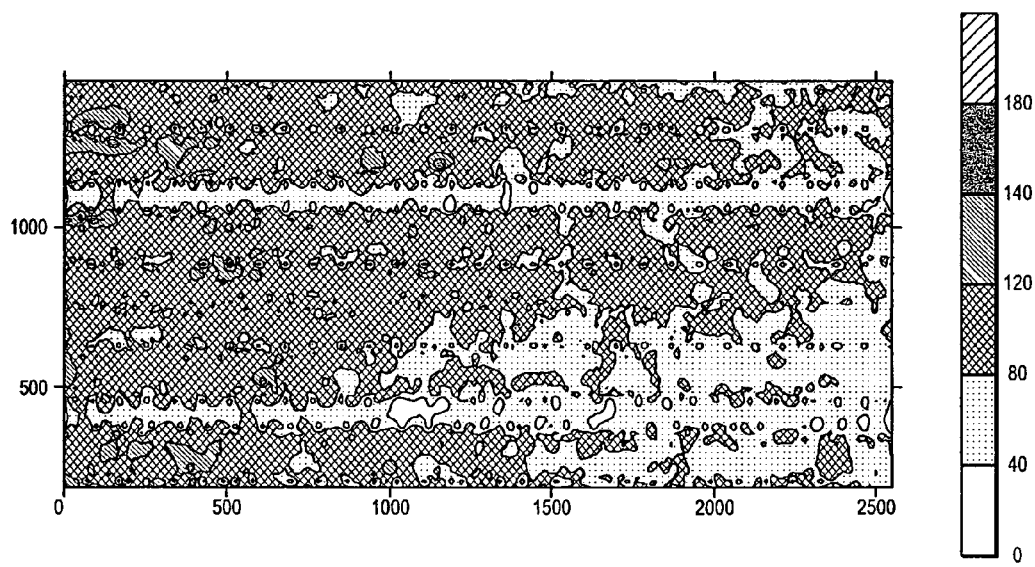
FIG. 13 shows a yield map showing a trend of decreasing yield from left to right.

Yield mapping: FIG. 12 shows one typical complete pistachio tree row harvested with the pistachio yield monitor. The field was not harvested by consecutive rows. Due to other experiments being performed in this particular field, data was obtained for four row sections. The first four rows were harvested, and then the next four rows were skipped. This pattern repeated from row one to row eighty. This particular row was harvested from east to west. Notice the decreasing yield from east to west. This pattern was apparent throughout the entire field as illustrated in FIG. 13. FIG. 11 shows the histogram of 6000 trees harvested inside an area of 32.4 hectares in a pistachio orchard. It illustrates the type of pistachio orchard yield variability that can be measured with the pistachio yield monitor. The mean value was 38.8 kg/tree, and the standard deviation was 12.1 kg/tree for the entire field. The west side of the field had a mean value of 42.4 kg/tree, whereas the east side of the field had a mean of 35.1 kg/tree. The histogram shows a normal distribution of yields (FIG. 11). The one bar near zero on the histogram represents the males trees in the orchard which are associated with no yield.

The yield data obtained demonstrated the capability of the pistachio yield monitor to assess the yield of each individual pistachio tree harvested. The data was successfully processed and yield was correlated to the specific trees using a combination of load cell, radar, and conveyor signals. The processed results were cross referenced with the hand data to ensure that each tree was assigned its specific yield. From the processed data, a yield map was successfully created for the field. This map showed the decreasing yield trend from the west side of the field to the east. The yield variability in the field ranged from a low of 6 kg to a high of 78 kg. These drastic differences can be due to multiple factors including, but not limited to, fertilizer deficiencies, pest infestations, and soil moisture content. This study yielded valuable information that can provide clues on how to better manage the field. The per tree basis yield data accurately obtained for 6000 trees in an orchard is a unique accomplishment. The capacity to easily determine yield can provide researchers, growers, and extension agents a greatly improved ability to conduct research and test new management strategies.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

All references, patent applications, and patents mentioned above are herein incorporated by reference in their entirety for all purposes. None of them are admitted to be prior art to the currently claimed inventions.

What is claimed is:

1. A method for weighing crops, the method comprising:
(a) loading a crop into a container using a crop transport apparatus;
(b) temporarily stopping the crop transport apparatus from loading the crop into the container;
(c) weighing the crop using the container;
(d) unloading the weighed crop from the container by automatically manipulating the container; and
(e) repeating steps (a)–(d), wherein the method further comprises: mapping the crop yield of individual trees in the orchard.

2. The method of claim 1 wherein the crop comprises nuts.

3. A method for weighing crops, the method comprising:
(a) loading a crop into a container using a crop transport apparatus;
(b) temporarily stopping the crop transport apparatus from loading the crop into the container;
(c) weighing the crop using the container;
(d) unloading the weighed crop from the container by automatically manipulating the container; and
(e) repeating steps (a)–(d),
wherein the crop is from a plant in a field comprising plants, and wherein the method further comprises: mapping the yields of the plants in the field.

* * * * *